United States Patent [19]

Palazzolo et al.

[11] Patent Number: 4,479,568
[45] Date of Patent: Oct. 30, 1984

[54] TRANSMISSION DISCONNECT UTILIZING AN AXIALLY SHIFTABLE DRIVE COLLAR

[75] Inventors: Faro D. Palazzolo, Oakland, Mich.; Roland A. Magnuson; Earl S. Aoki, both of King, Wash.

[73] Assignee: The United States of America as represented by the Secretary of the Army, Washington, D.C.

[21] Appl. No.: 370,306

[22] Filed: Apr. 21, 1982

[51] Int. Cl.³ .............................................. F16D 11/00
[52] U.S. Cl. ............................... 192/67 R; 192/89 R; 192/108; 192/114 R; 123/179 R; 74/572
[58] Field of Search ................ 192/63, 89 QT, 89 R, 192/34, 99 S, 108, 67 R, 20, 101, 3.21; 74/572, 366, 369, 371, 372; 123/179 R

[56] References Cited

U.S. PATENT DOCUMENTS 3,600,962  8/1971  Ivanchich ........................ 74/371 X

OTHER PUBLICATIONS

Technical Manual TM 9-2520-238-34, pp. 1-5, 3-1, and 3-19.

Primary Examiner—Rodney H. Bonck
Assistant Examiner—David D. House
Attorney, Agent, or Firm—Peter A. Taucher; John E. McRae; Robert P. Gibson

[57] ABSTRACT

An engine-transmission disconnect mechanism that includes mating splines and spline grooves on a drive collar-shaft assembly. End areas of selected splines are set back from the collar-shaft interface to facilitate meshed engagement of the splines and grooves when the engine is operated. The mechanism can be shifted between the connect and disconnect modes while the engine is running.

1 Claim, 3 Drawing Figures

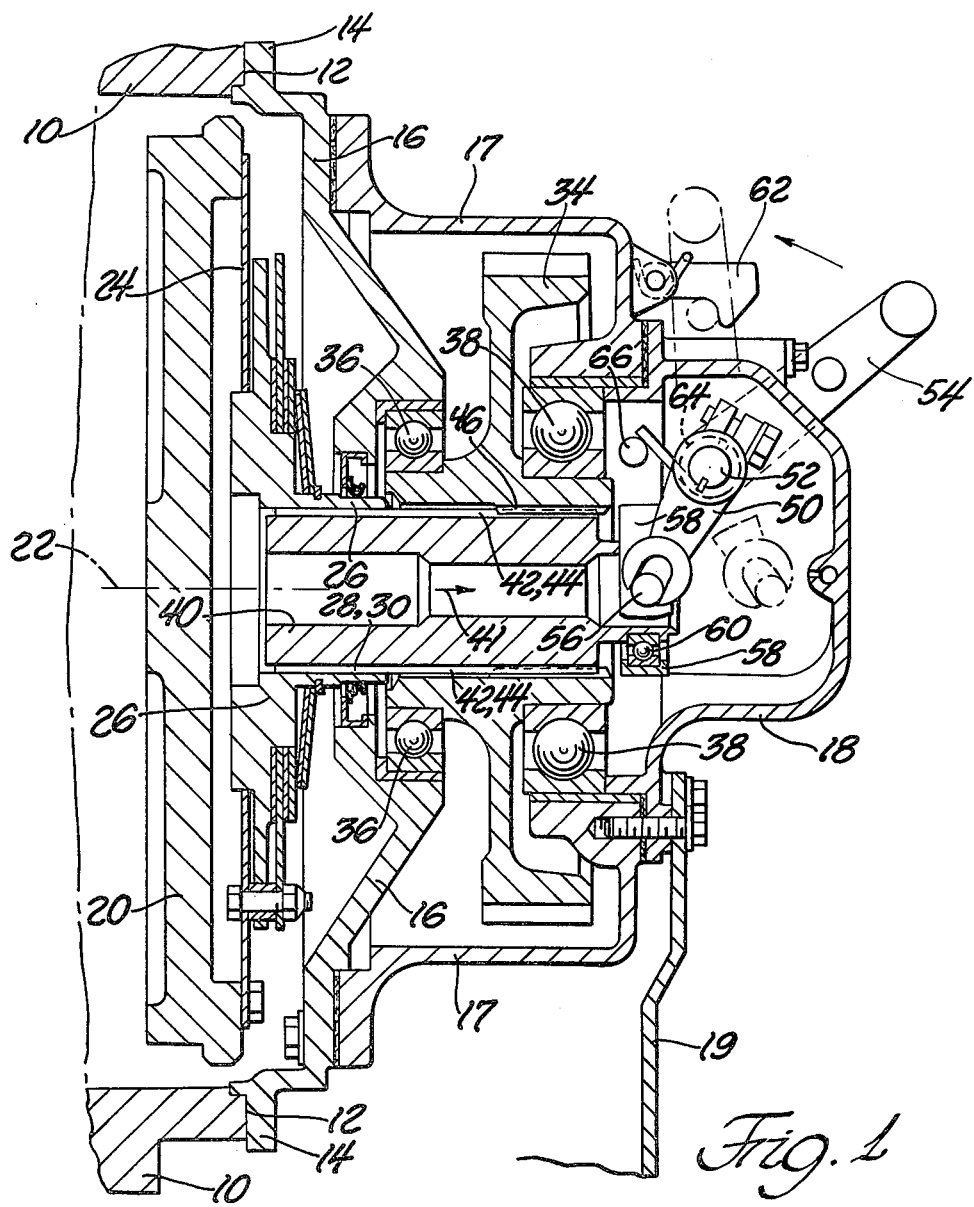
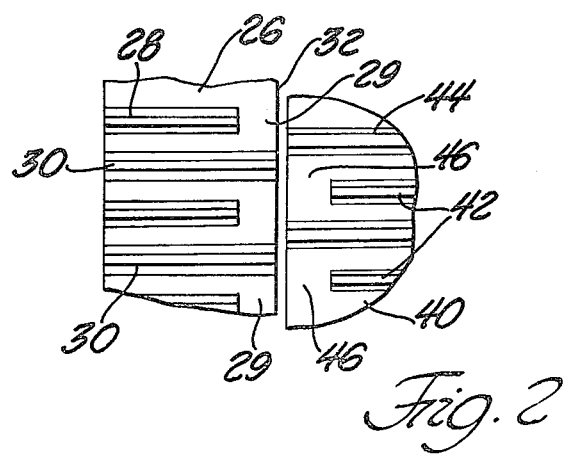
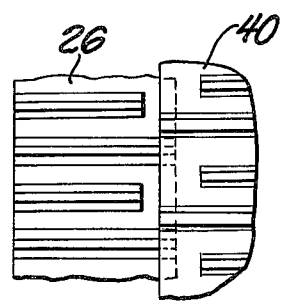
Fig. 1
Fig. 2
Fig. 3

1

TRANSMISSION DISCONNECT UTILIZING AN AXIALLY SHIFTABLE DRIVE COLLAR

GOVERNMENT INTEREST

The invention described herein may be manufactured, used, and licensed by or for the Government for governmental purposes without payment to us of any royalty thereon.

BACKGROUND AND SUMMARY OF THE INVENTION

Power plants for military land vehicles of the wheeled or tracked type usually comprise a piston engine and variable speed ratio transmission arranged in abutting in-line relation. Often the transmission includes a flanged housing having a ring of bolt holes designed to individually fit on threaded studs premounted in a face of the engine block; nuts are threaded onto the exposed portions of the studs to rigidly fasten the transmission housing to the engine.

It is necessary that during the act of bolting the transmission onto the engine the drive components within the transmission housing automatically mate with companion drive components in the engine. Often the engine drive component is an internally splined collar carried by the engine flywheel; the mating component in the transmission housing is in that case an externally splined shaft. There is an installation problem due to the fact that the splines on one component can be circumferentially misaligned from the grooves on the other component; the transmission housing often obscures the drive components so that manual rotation of one drive component into precise circumferential alignment with the other drive component becomes a difficult or uncertain trial-and-error process.

Another problem concerns operation of military vehicles in arctic climates. At initial engine start-up some of the drive components in the transmission, such as the transmission input shaft, input gearing and torque converter components, are operatively connected to the flywheel for conjoint rotation therewith. At sub-zero temperatures the lubricant for the various drive components in the transmission is in a relatively cold viscous state so that some starter effort is required to rotate the transmission components; this somewhat lowers the engine cranking speed, and makes it more difficult to start the engine.

Some military vehicles have a manual-disconnect system between the engine flywheel and the input drive component in the transmission to minimize cold weather starting problems. The present invention is concerned with such a disconnect system. Principal objects of the invention are to provide a disconnect system that can be retained in a retracted disconnect mode while the transmission is being bolted to the engine, either at initial assembly or after a repair operation on either the engine or transmission. Another object is to provide an engine-transmission disconnect system that can be set to automatically connect the engine flywheel to the transmission input drive component subsequent to the process of bolting the transmission onto the engine. A further object is to provide an engine-transmission disconnect system that is relatively strong, simple and compact, while not requiring the technician to precisely line up splined areas on the engine and transmission drive components during an engine-transmission assembly operation.

THE DRAWINGS

FIG. 1 is a fragmentary sectional view of an engine-transmission assembly embodying our invention.

FIGS. 2 and 3 show structural details of a spline system used in the FIG. 1 embodiment.

Referring more particularly to FIG. 1, there is fragmentarily shown an engine block 10 having an annular face 12 adapted to receive the flange 14 of a transmission housing component 16; stud-nut assemblies, not shown, are located at spaced points around the engine-transmission interface to secure component 16 on the engine. The complete transmission housing includes additional housing elements bolted to component 16, e.g., housing components 17, 18 and 19. Only a fragmentary portion of the transmission assembly is shown in FIG. 1.

Disposed within engine block 10 is a flywheel 20 having a rotational axis 22. A drive collar 26 is affixed to flywheel 20 through the mechanism of a resilient drive plate 24. Collar 26 has internal splines 28 and 30 therein. As shown best in FIG. 2, splines 28 have their right ends set back from the right end face 32 of collar 26 of define free zones 29. Splines 30 extend to end face 32.

The transmission includes an input gear 34 mounted within the transmission housing by means of two radial anti-friction bearings 36 and 38. The outer race of each bearing is engaged with the housing structure, and the inner race of each bearing is engaged with the gear. Gear 34 has an axial opening therethrough which accommodates a hollow floating shaft 40, sometimes hereinafter referred to as a connector shaft because it acts as a driving connection between the aforementioned drive collar 26 and gear 34. Shaft 40 has external splines 42 and 44 thereon engaged with spline grooves 46 on the gear 34 internal surface; shaft 40 is precluded from rotating relative to gear 34, but the shaft can under certain conditions slide axially as designated by arrow 41 in FIG. 1.

As best seen in FIG. 2, the left ends of splines 42 are set back from the left end face of shaft 40 to define free zones 47. Splines 44 extend to the end face of shaft 40. FIG. 2 shows shaft 40 displaced rightwardly from its FIG. 1 position. The FIG. 1 position may be considered the "drive" position of shaft 40, since the shaft then extends from gear 34 into collar 26 to form a driving connection between the collar and gear. The FIG. 2 position of shaft 40 may be considered as the "disconnect" position of the shaft, since in that position the shaft is drawn axially away from collar 26 to interrupt or disconnect the drive connection between collar 26 and gear 34.

Shaft 40 may be moved in the arrow 41 direction (FIG. 1) by a manually-operated means that includes a yoke element 50 affixed to a rotary shaft 52 extending transverse to the shaft 40 rotational axis 22. An external lever-like handle 54 is suitably connected to shaft 52 to move yoke element 50 from its full line position to its dashed line position; stroke length is about fifty degrees measured around the shaft 52 axis. Where the area near the transmission is inaccessible handle 54 can be remotely located in an accessible zone and connected to shaft 52 by suitable cables or linkages suited to the specific system.

Yoke element 50 includes two spaced arms, each having a slot therein for accommodating a pin 56 extending outwardly from an anti-friction collar 58. Collar 58 encircles the right end of shaft 40 but does not rotate with the shaft, due to the fact that anti-friction elements 60 enable shaft 40 to freely turn within collar 58 without transmitting the rotational force to the collar. A flange on the end of shaft 40 clamps the inner race of the anti-friction assembly to the shaft.

To move shaft 40 in the arrow 41 direction a counterclockwise force is applied to handle 54. Yoke 50 moves to the dashed line position, causing the yoke element arms to draw collar 58 to the right. This action causes the left end face of shaft 40 to move out of collar 26 to the "disconnect" position of FIG. 2. The manual retracting motion can be accomplished whether shaft 40 happens to be rotating or stationary. A suitable latch 62 may be employed to hold the components in the disconnect position, as for example when it is desired to start the engine in arctic climates without loads imposed thereon by the transmission.

The invention contemplates the use of a spring means to move connector shaft 40 from its disconnect position (FIG. 2) to its drive position (FIG. 1). The spring means can be of various types, such as a tension coil spring, a torsion bar, a clock spring, leaf spring, compression coil spring, etc. For illustration purposes we show a multi-convolution torsion spring 64 encircling a section of shaft 52 behind yoke element 50. One end of the spring is suitably anchored to shaft 52 or yoke element 50. The other end of the spring is anchored to the housing structure, as by means of a pin 66. The spring is wound and stressed to urge yoke element 50 to its full line position corresponding to the drive position of shaft 40. Spring 64 is effective when handle 54 is unlatched from latch 62.

During the process of bolting the transmission assembly to engine block 10 handle 54 may be held in the latched position, wherein shaft 40 is retracted out of engagement with drive collar 26. The transmission can be bolted to the engine even though the splines on shaft 40 may not precisely align with the spline grooves in collar 26. After the transmission is mounted on the engine latch 62 may be operated to release handle 54. Spring 64 is then effective to propel yoke element 50 and shaft 40 rightwardly toward the drive position. Should the shaft 40 splines be misaligned with the collar 26 spline grooves the ends of splines 44 will strike against either the ends of splines 28 or the ends of splines 30, depending on the nature of the misalignment. In any event when the engine is initially cranked the spring 64 bias will cause the ends of splines 44 to move into free zones 29, as shown in FIG. 3. As drive collar 26 rotates the splines 30 will automatically contact the overlapped end sections of splines 44 and thus align said splines with the collar 26 grooves. The spring 64 bias will force shaft 40 to the FIG. 1 drive position.

The use of staggered or set-back splines to achieve spline-groove alignments is already known, for example in clutch synchronizers. Our invention relates specifically to an engine-transmission disconnect environment and the combination of features recited in the appended claims.

We wish it to be understood that we do not desire to be limited to the exact details of construction shown and described for obvious modifications will occur to a person skilled in the art.

We claim:

1. In an engine-transmission assembly wherein the engine includes a flywheel that carries an internally splined drive collar, and the transmission comprises a housing structure having an opening therein freely receiving the drive collar: the improvement comprising an input gear disposed within the transmission housing in axial alignment with the drive collar; two axially spaced anti-friction bearings having their outer races engaged with the transmission housing and their inner races engaged with the gear, whereby the gear is mounted for rotational movement around its central axis; said input gear having an axial opening therethrough, the internal surface defined by the opening in the gear having axial splines formed thereon; a floating connector shaft slidably disposed within the opening in the input gear for axial motion toward or away from the drive collar; said connector shaft extending completely through the gear and therebeyond, so that a first end of the shaft is exposed to the space within the drive collar and a second end of the shaft is exposed to a space beyond the gear remote from the drive collar; said connector shaft external splines thereon continually engaged in the grooves defined by the transmission input gear splines to preclude relative rotation between the shaft and gear; manually-operated means for moving the floating connector shaft between a drive position extending into the drive collar and a disconnect position retracted away from the drive collar; said connector shaft having only the above-noted disconnect position and the above-noted drive position; said manually-operated means comprising an anti-friction collar encircling the second end of the connector shaft, means permitting the shaft to rotate freely on its axis without transmitting shaft rotational force to the anti-friction collar, a yoke element swingable on an axis transverse to the connector shaft axis, and a force connection between the yoke element and anti-friction collar whereby swingable motion of the yoke element causes the anti-friction collar to draw the shaft to its disconnect position even though the shaft may be rotating; and spring means operable to normally urge the connector shaft toward its drive position; alternate ones of the splines on the drive collar terminating inwardly from the drive collar end face presented to the connector shaft; alternate ones of the splines on the connector shaft terminating inwardly from the shaft end face presented to the drive collar; said alternate splines defining free zones for allowing the leading ends of the other splines on the shaft and drive collar to circumferentially overlap one another as the spring means forces the connector shaft into the drive collar.

* * * * *